UNITED STATES PATENT OFFICE.

FERDINAND BLUM, OF FRANKFORT-ON-THE-MAIN, GERMANY, ASSIGNOR TO FIRM OF E. MERCK, OF DARMSTADT, HESSEN, GERMANY.

GLYCOSURIA ANTIDOTE AND PROCESS OF PRODUCING SAME.

SPECIFICATION forming part of Letters Patent No. 705,638, dated July 29, 1902.

Application filed April 24, 1902. Serial No. 104,524. (No specimens.)

*To all whom it may concern:*

Be it known that I, FERDINAND BLUM, a German subject, residing at Frankfort-on-the-Main, Germany, have invented certain new and useful Improvements in Glycosuria Antidotes and Processes of Producing the Same; and I do hereby declare the following to be a full, clear, and exact description of the invention, such as will enable others skilled in the art to which it appertains to make and use the same.

My invention is based upon the discovery that the suprarenal glands contain a substance which when introduced into the circulation by subcutaneous or intravenous injection uniformly produces glycosuria, (excretion of sugar.) The glycosuria thus produced is of only short duration—say from one to five days. With this poison thus contained in the suprarenal glands I have succeeded in so treating animals that not only have the animals themselves successfully withstood the injection of gradually-increasing quantities thereof, but that protecting substances serving as an antidote or specific against the poison have formed in their blood. I have furthermore demonstrated that these protecting substances when transmitted to other animals—even animals of a different species—are likewise able to protect the latter against suprarenal-gland poisoning.

My invention or discovery, therefore, contemplates the production of a protecting substance, specific, or antidote against suprarenal-gland poisoning and may be practiced as follows: Inject into a dog subcutaneously the juice of two of the suprarenal glands of a sheep. The dog will exhibit the well-known evidences of poisoning, will remain sick for from two or three days, and will excrete 4.1 per cent. of sugar. After his recovery inject, subcutaneously, the juice of three suprarenal sheep-glands, and after he has again recovered inject in the same manner successively the juice of four, then six, then eight, then ten, and so on (increasing by two at each injection) up to thirty suprarenal sheep-glands, giving the dog time to recover from each injection and the sickness occasioned thereby before proceeding with the next injection of the series. When the dog has recovered from the last injection, a quantity of blood is to be taken from him, which blood contains the protective substance in ample quantity. I have, for instance, injected twenty cubic centimeters of the serum of this blood subcutaneously into a rabbit and thereafter injected into the rabbit in like manner the juice of two suprarenal sheep-glands. The rabbit withstood the treatment, whereas without the injection of the serum there would have resulted severe glycosuria, severe sickness, and, finally, death. The rabbit thus treated with the serum not only remained in good health, but excreted no sugar.

The serum constitutes a remedy for all the diseases which are occasioned by the faulty functioning of the suprarenal glands, and particularly against glycosuria, in so far as the latter is brought about by such faulty functioning. The function of the suprarenal glands is to take up and render innocuous certain poisons produced in the body. It is well known that in the digestive system and in the liver carbohydrates and food containing carbohydrates are converted into grape-sugar (or into glycoses and thereafter into grape-sugar) and that this sugar is then by a further transformation, not yet fully investigated, brought into a condition in which the cells can assimilate it. The activity of the organs which bring about this capacity for assimilation is diminished if the suprarenal glands do not perform their proper functions. In analogy to the thyroid gland we may assume that the poisons are first detained in the suprarenal glands and are transformed therein first partially and then wholly. The partially-transformed poisons have not lost their poisonous character, but are merely modified to a greater or less degree. When the suprarenal glands, therefore, do not perform their proper functions, they discharge these partially-modified poisons again into the circulation, and these are the poisons which interfere with the further transformation of the grape-sugar, and consequently occasion glycosuria and the like. Their injurious action is neutralized by the protective substance present in the serum obtained by the process hereinbefore described.

What I claim is—

1. The process of producing an antidote or antitoxin for the treatment of diseases due to the faulty or imperfect action of the suprarenal glands, which consists in injecting subcutaneously into an animal the juice of suprarenal glands, thereafter drawing blood from the animal, and obtaining the serum thereof; substantially as described.

2. The process of producing an antidote or antitoxin for the treatment of diseases due to the faulty or imperfect action of the suprarenal glands, which consists in injecting subcutaneously into an animal successively-increasing doses of the juice of suprarenal glands, thereafter drawing blood from the animal, and obtaining the serum thereof; substantially as described.

3. As a new substance, glycosuria antidote or antitoxin, consisting of the serum of the blood of an animal into whose veins has been injected the juice of suprarenal glands; substantially as described.

In testimony whereof I affix my signature in presence of two witnesses.

FERDINAND BLUM.

Witnesses:
JEAN GRUND,
CARL GRUND.